United States Patent
Kumpf

(10) Patent No.: US 6,581,098 B1
(45) Date of Patent: Jun. 17, 2003

(54) SERVER PROVIDING ACCESS TO A PLURALITY OF FUNCTIONS OF A MULTIFUNCTION PERIPHERAL IN A NETWORK

(75) Inventor: David A. Kumpf, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/407,129

(22) Filed: Sep. 27, 1999

(51) Int. Cl.[7] .............................................. G06F 15/16
(52) U.S. Cl. ........................ 709/227; 709/203; 709/245
(58) Field of Search ................................. 709/245, 203, 709/227, 228

(56) References Cited

U.S. PATENT DOCUMENTS

| | | | | |
|---|---|---|---|---|
| 4,821,259 A | * | 4/1989 | DeBruler et al. | 370/354 |
| 5,845,076 A | * | 12/1998 | Arakawa | 709/203 |
| 5,933,580 A | * | 8/1999 | Uda et al. | 358/1.13 |
| 6,125,372 A | * | 9/2000 | White | 707/205 |
| 6,223,223 B1 | * | 4/2001 | Kumpf et al. | 709/203 |
| 6,246,487 B1 | * | 6/2001 | Kobayashi et al. | 358/1.13 |
| 6,289,371 B1 | * | 9/2001 | Kumpf et al. | 709/203 |
| 6,487,611 B1 | * | 11/2002 | Brusky et al. | 358/1.13 |

FOREIGN PATENT DOCUMENTS

| | | | |
|---|---|---|---|
| EP | 0 843 440 | 5/1998 | |
| EP | 0 859 321 | 8/1998 | |
| EP | 0 991 256 | 4/2000 | |
| JP | 11177755 A | * 7/1999 | ............ H04N/1/00 |

* cited by examiner

Primary Examiner—Moustafa M. Meky
Assistant Examiner—LaShonda Jacobs

(57) ABSTRACT

A network peripheral server is adapted to enable a plurality of clients in a network to access a plurality of functions supported by a multifunction peripheral connected to the network. The server includes a network interface for communicating with the clients on the network according to a predetermined network protocol, a peripheral interface for communicating with the multifunction peripheral via a plurality of peripheral channels corresponding to the plurality of functions supported by the multifunction peripheral, and a gateway communicatively connected between the network interface and the peripheral interface for transferring data between the network interface and the peripheral interface. Also provided in the server is a firmware and or software which is responsive to predetermined instructions from at least one of the plurality of clients for operatively connecting the at least one client with at least one selected one of the plurality of functions supported by the multifunction peripheral via a corresponding one of the plurality of peripheral channels.

18 Claims, 8 Drawing Sheets

SERVER PROVIDING ACCESS TO A PLURALITY OF FUNCTIONS OF A MULTIFUNCTION PERIPHERAL IN A NETWORK

The present invention generally relates to software and firmware control of a multifunction peripheral in a network through a server that connects to the network, and more particularly to software and firmware of a peripheral server that provides access to a plurality of functions of a multifunction peripheral in a network.

Multifunction peripherals (MFP) are becoming increasingly popular, because they provide a number of different functions such as scanning, printing, copying, and sending and receiving faxes, for example, in a single device. Until recently, an MFP had to be attached directly to a single computer to access all the services offered by the MFP. This arrangement, however, excluded other computers from accessing the MFP. When the MFP is implemented in a network through a conventional peripheral server, only the print function of the MFP is accessible by the clients, which are typically personal computers (PC). In commonly assigned U.S. patent application Ser. No. 09/164,454 filed Sep. 30, 1998 by Kumpf et al., a network peripheral server is disclosed which is capable of simultaneously accessing both the scanning function and the printing function of an MFP connected in a network. The Kumpf et al. application is incorporated by reference herein.

The peripheral server of the above Kumpf et al. invention, however, still does not allow access to any other functions of an MFP other than the print and the scan functions. An additional shortcoming of known servers is that they communicate with the attached MFP only through known I/O channels. Any MFP that utilizes different I/O channels would not work with these servers without first being updated by the user, which is inconvenient.

Accordingly, it is a primary object of the present invention to provide an improved network peripheral server which provides access to a plurality of functions supported by a multifunction peripheral connected to a network.

An additional object of the present invention is to provide an improved network peripheral server which provides access to a plurality of functions of the multifunction peripheral in addition to the print and scan functions.

A further object of the present invention is to provide an improved network peripheral server including a general purpose gateway which provides data pass-through for a plurality of functions of the multifunction peripheral, thereby eliminating the need to create a separate gateway corresponding to each accessed functions.

Another object of the present invention is to provide an improved network peripheral server which provides network access to the functions of the multifunction peripheral on any channel supported by the multifunction peripheral.

Other objects and advantages will become apparent upon reading the following detailed description, in conjunction with the attached drawings, in which.

DETAILED DESCRIPTION OF THE INVENTION

Broadly stated, the present invention is directed to a network peripheral server which is adapted to enable a plurality of clients connected in a network to access all the functions or services offered by a multifunction peripheral connected to the same network by the server. The server obtains from the peripheral the address of the peripheral communication channel of a particular function requested by a client, and connects the requesting client to the peripheral through that peripheral channel, so that the desired function is available to the client.

The server includes a network interface for communicating with the clients on the network according to a predetermined network protocol, a peripheral interface for communicating with the multifunction peripheral via a plurality of peripheral channels corresponding to the plurality of functions supported by the multifunction peripheral, and a gateway provided by firmware for communicatively connecting the network interface with the peripheral interface for transferring data between the network interface and the peripheral interface. Responsive to predetermined instructions from one or more of the plurality of clients, the firmware also operatively connects the client with one or more selected functions of the plurality of functions supported by the multifunction peripheral via a corresponding channel of the plurality of peripheral channels.

The present invention also concerns a method for enabling a plurality of clients connected to a network via a peripheral server to access a plurality of functions supported by a multifunction peripheral connected to the network. The method includes sending a service name lookup instruction from any of the plurality of clients for requesting the address of the channel of the peripheral corresponding to the selected function of the multifunction peripheral, opening the corresponding peripheral channel to communicatively connect the client to the selected function, and transferring data between the client and the multifunction peripheral through the peripheral server.

Figure 1:
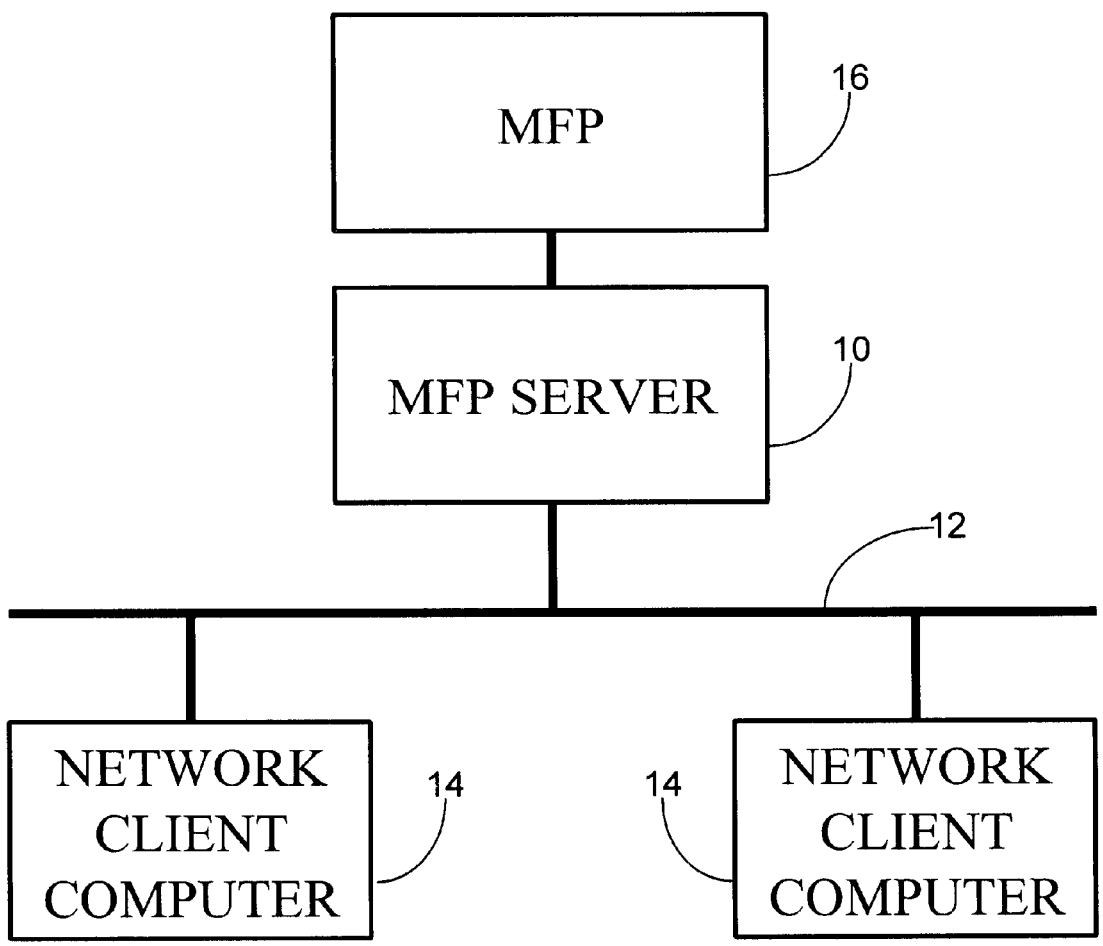
FIG. 1 is a block diagram showing the network system in which the present invention is implemented.

Referring now to FIG. 1, a server 10 of the present invention is adapted to be connected to a network 12 along with a plurality of clients 14 (two shown). The server 10 is also connected to at least one multifunction peripheral (MFP) 16. Operatively, the MFP 16 is connected to the network 12 via the server 10.

Figure 2:
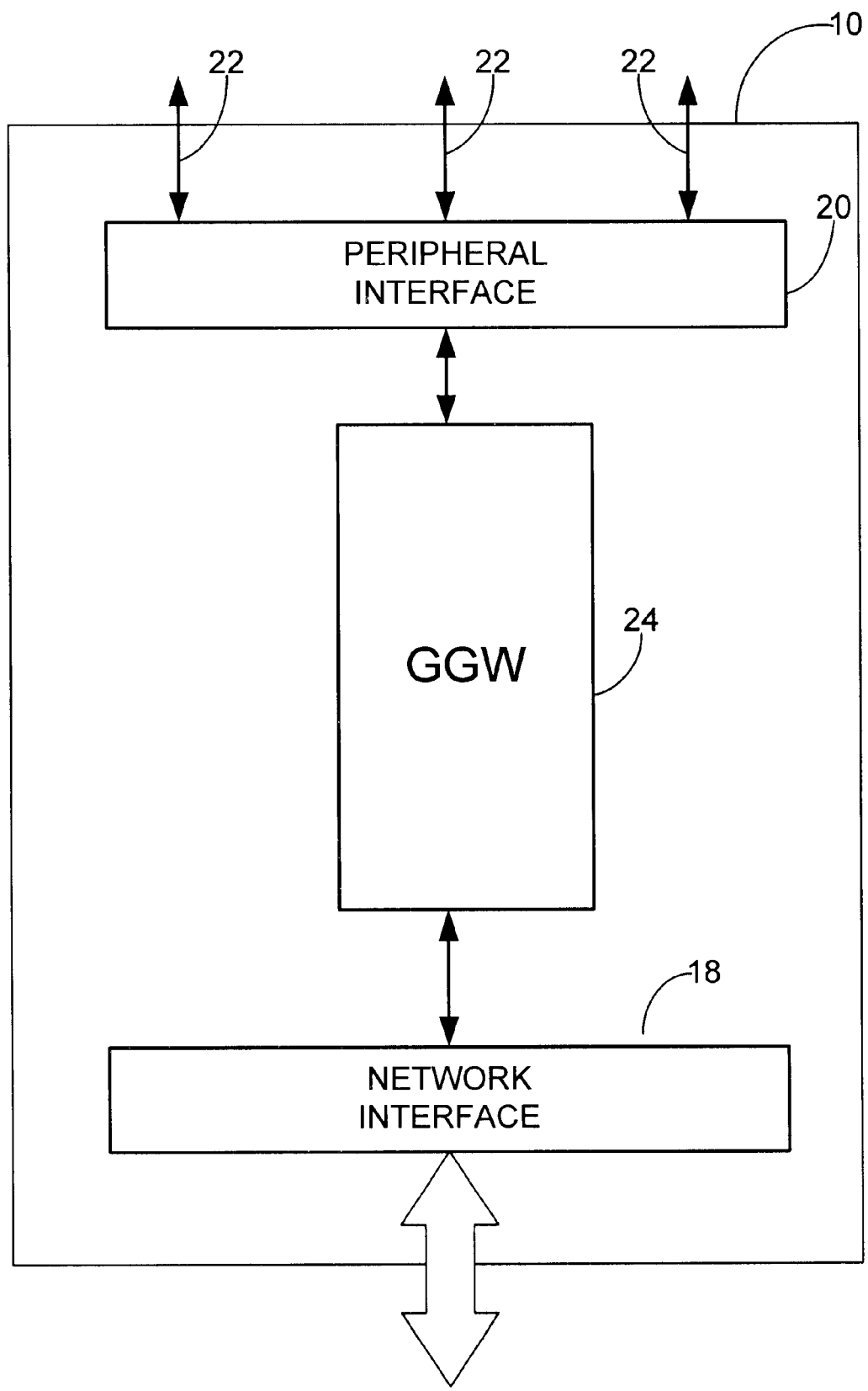
FIG. 2 is a logical block diagram of a preferred server of the present invention.

Turning now to FIG. 2, the server 10 includes a network interface 18 which preferably includes at least one TCP port and/or at least one SPX socket for connection to the network 12 using a conventional TCP protocol and/or an SPX protocol, respectively. Also included is a peripheral interface 20 which is preferably a known 1284.4 module interface, although other known interfaces such as Hewlett-Packard (HP) EIO, HP-MIO, PCI, IEEE 1394 and a serial link such as USB, for example, are also contemplated. The interface 20 is adapted to connect the server 10 to the MFP 16, and enables the client 14 to access each of the functions supported by the MFP via a plurality of corresponding peripheral channels 22, which are preferably IEEE 1284.4 channels or some equivalent protocol channels. Communication links such as PCI, USB or other known links are also contemplated.

A general purpose gateway (GGW) 24 is provided by the server firmware to be connected between the network interface 18 and the peripheral interface 20 and provides a bi-directional data pass-through between the network interface and the peripheral interface for the desired functions. The GGW 24 also allows the client 14 to request a specific peripheral channel 22 corresponding to a particular function of the MFP 16, thereby eliminating the need to establish a new gateway for each of the desired functions. When more than one MFP 16 is supported by server 10, a GGW 24 is provided for each MFP. The GGWs 24 are executed independently of each other and are addressed with different PCT ports or SPX sockets.

Figure 3:
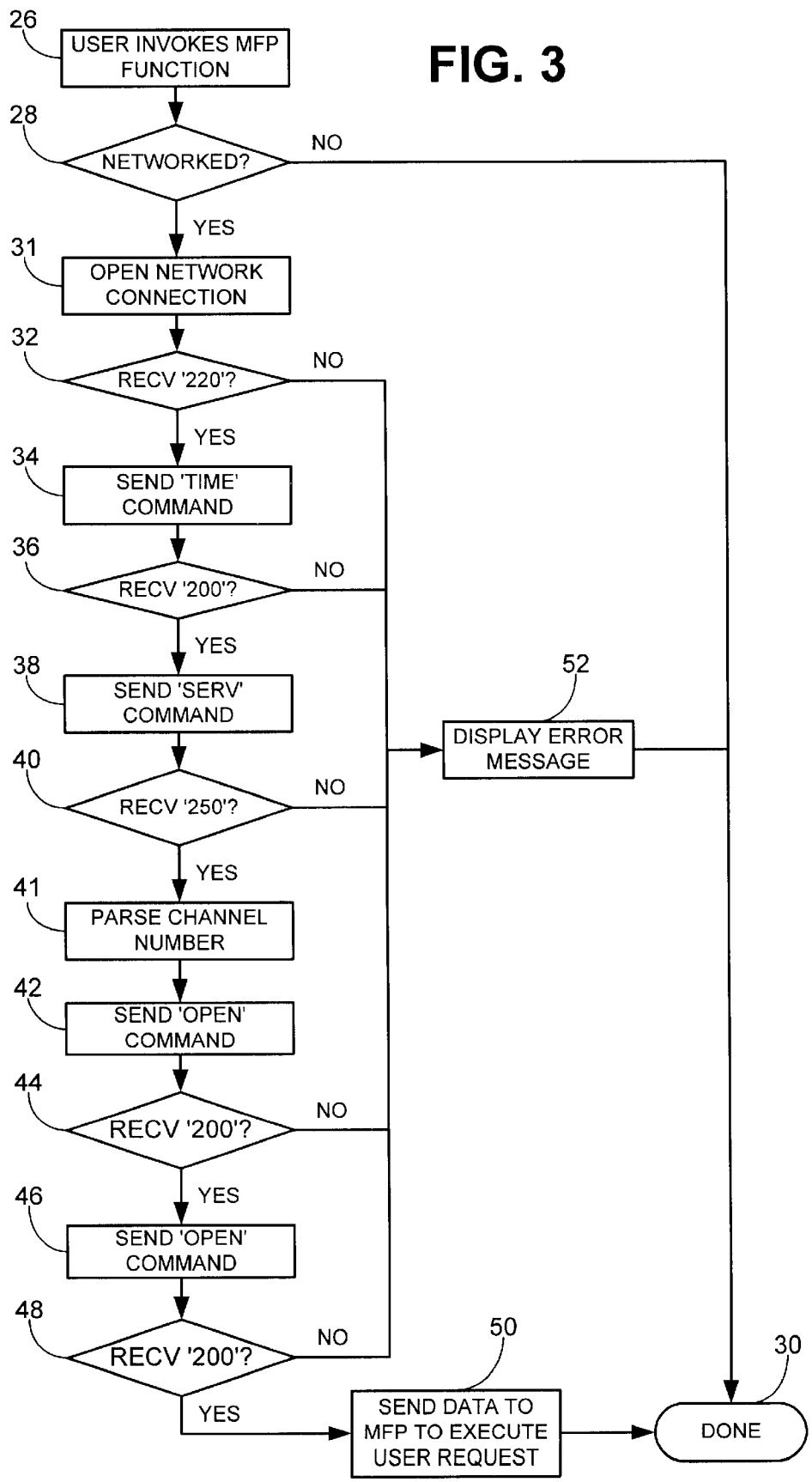
FIG. 3 is a flowchart illustrating the operations of a client for accessing the functions of the multifunction peripheral in accordance with the present invention.

Turning now to FIG. 3, the operation of a software program in the client 14 which enables the client to access a particular MFP function is illustrated. Initially, when a user on a networked client requests an access to a particular function of the MFP 16 (block 26), it is determined whether the intended peripheral is connected to the network 12 or directly to the client 14 (block 28). If the MFP 16 is not networked, the process comes to an end (block 30), and the MFP is operated in a known manner by the computer to which the MFP is connected.

If the MFP 16 is networked, a network connection is established between the client 14 and the server 10 (block 31) via one of the TCP ports or SPX sockets. The server 10 is initially in command mode and listens for commands from the client 14 on the connection. When a command is received from the client 14, the server 10 issues a response, preferably with a three digit outcome code number which follows the FTP and the SMTP conventions. For example, any number that begins with a "2" is a successful outcome, and that with a "4" or a "5" is an unsuccessful outcome. The remaining digits give more detail about the outcome. The response preferably also includes some descriptive texts, for example, "200 ok," "421 no channel available," etc.

Once the network connection is successfully established (block 32), the client 14 sends a TIME command (block 34) which sets the idle timeout of the established connection in seconds. If no data is exchanged between the client 14 and the MFP 16 for the set number of seconds, the server 10 closes the connection between them. After the idle timeout has been set (block 36), the client 14 sends a SERV command to the server 10 to request a peripheral Service Name Lookup (block 38) to) learn the peripheral channel address of the requested function or service supported by the MFP. Once the SERV command has been carried out and the reply, from the server 10 has been received (block 40), the client 14 parses the text following the successful output code number "250" to extract the channel number corresponding to the requested function (block 41). The client 14 then issues an OPEN command to the server 10 to open that peripheral channel 22 (block 42). When the channel 22 has been opened (block 44), the client 14 issues a DATA command (block 46), requesting that that server 10 go into a data pass-through mode. When placed in this mode (block 48), the client 14 communicates directly with the MFP 16 to access the desired functions and the GGW 24 of the server 10 merely passes data between the client and the MFP (block 50) until the connection is closed (block 30). It should be noted that once in the pass-through mode, the client 14 must close the connection to terminate data being transmitted through the GGW 24. However, in the event the MFP 16 closes the channel, the server 10 closes the connection. If at any of the blocks 28, 32, 36, 40, 44 and 48, the server 10 outputs a response indicating an unsuccessful outcome, i.e., sends a number that begins with a "4" or a "5", an error message is displayed to the user (block 52), and the process is terminated (block 30). It should be understood that the TIME and SERV commands are preferred, but not mandatory. An alternate client implementation may skip these steps and still access the peripheral successfully. It should also be understood that not all commands the server 10 supports are used in this preferred client embodiment. Situations where the other commands might be used will be obvious to one of ordinary skill in the art.

Turning now to FIGS. 4A–4E, the operation of the server 10 responsive to commands received from the client 14 is illustrated. The server 10 is event driven, and as such, it waits for an event (block 54), i.e., a command or a reply, from the client 14 or the MFP 16 after initializing. When an event occurs, the server 10 resets the idle timeout for the client connection to which the event applies, initially set by the client 14 (block 56), and determines which event has occurred (block 58). Events that arrive while another event is being processed are queued until the current event processing is completed.

When a new connection request is received from the client 14 (block 60), the server 10 determines if it can accept the new connection request (block 62). In the preferred embodiment, the server 10 is capable of supporting two simultaneous connections, although more simultaneous connections are contemplated. If the maximum number of connections is already established, the server sends a '421' error message to the client (block 64), closes the network connection (block 66), and waits for another event to occur (block 54). If the server 10 is able to accept the connection, it sets the connection state to COMMAND (block 68), sends a '200' success message to the client 14 (block 70) and returns to waiting for an event (block 54).

When data is received from the client 14 (block 72), the server 10 determines whether the client is sending data to the MFP 16, i.e., the client is in DATA mode, or issuing a command, i.e., the client is in COMMAND mode (block 74). If the client 14 is in DATA mode, the server 10 checks if the channel 22 requested in the data is open to the MFP 16 (block 76). If so, the data is sent to the MFP 16 over that channel 22 (block 78). If not, the data is queued until that channel 22 is open (block 80). After the completion of either procedure, the server 10 returns to waiting for an event (block 54). On the other hand, if the client 14 is in COMMAND mode, the server 10 invokes the appropriate command processing procedures shown in FIG. 4B.

Figure 4A:
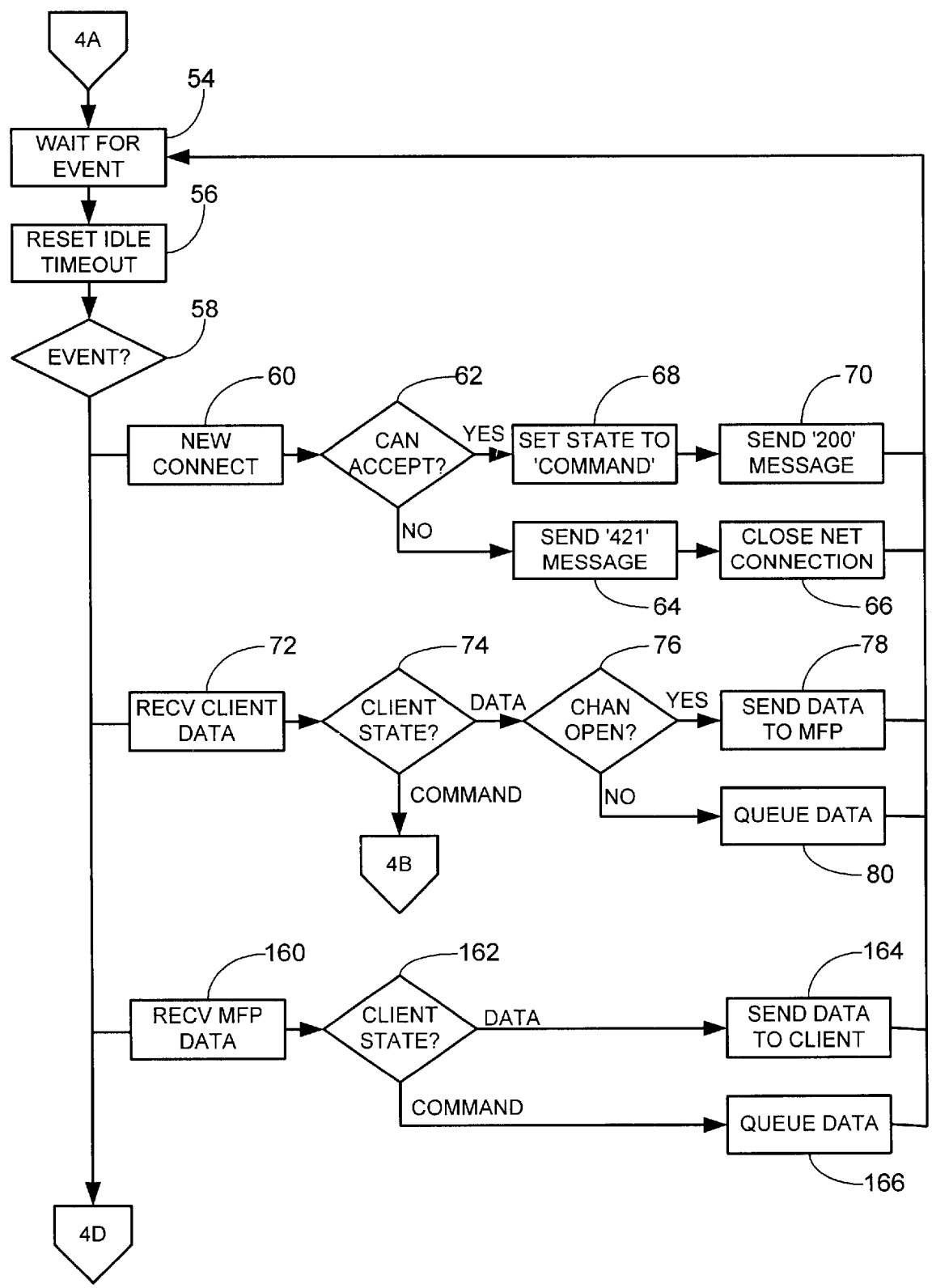
FIGS. 4A–4E are flowcharts illustrating the operations of the server of FIG. 2.
Figure 4B:
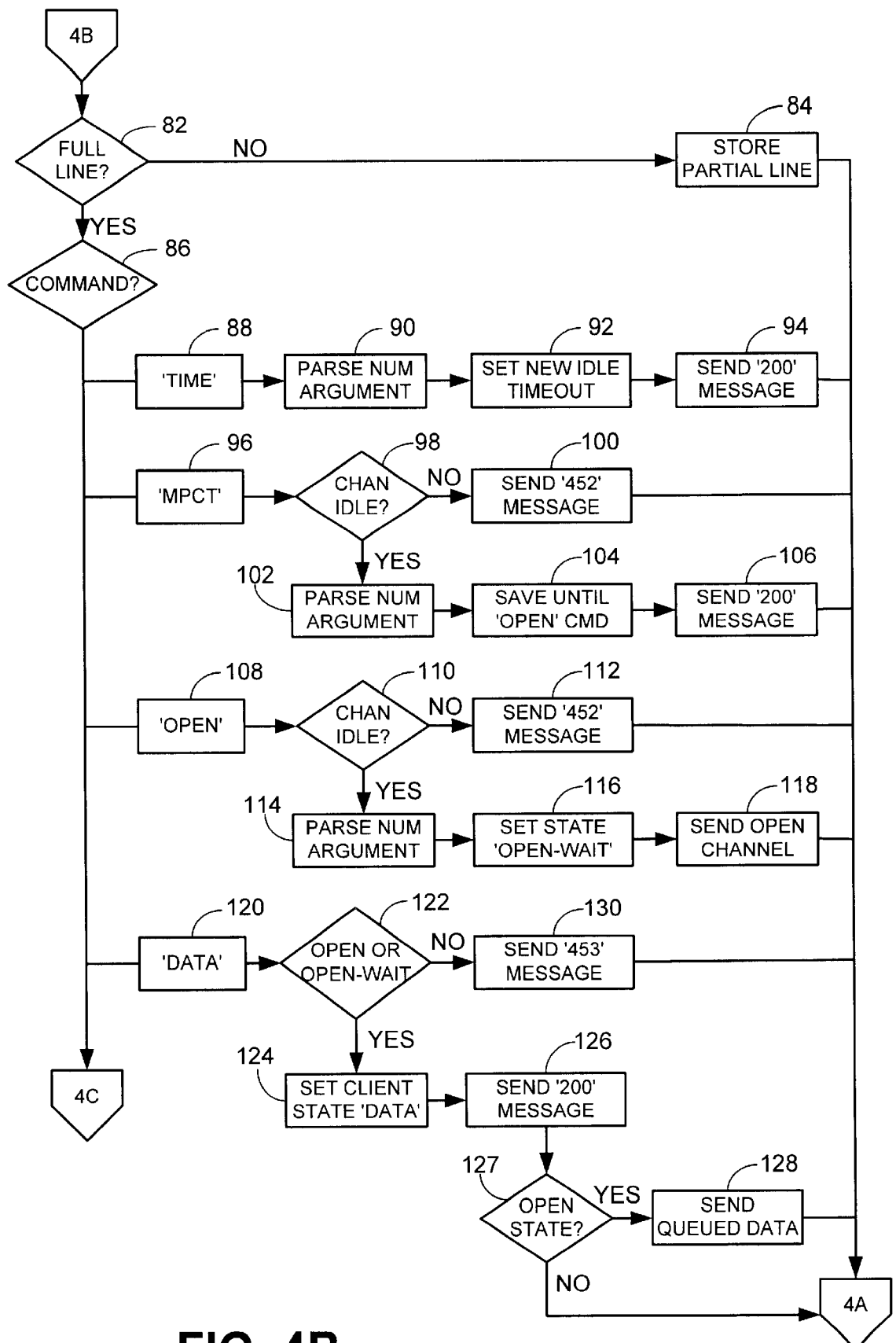

Turning now to FIG. 4B, to process a command, the server 10 must first wait until the client 14 has sent a complete line of text (block 82), because a line may be transmitted across the network 12 in pieces. As known in the art, a line of text is any sequence of characters preferably ending with an optional Carriage Return (CR) character (ASCII code 13) followed by a mandatory Line Feed (LF) character (ASCII code 10). The server 10 accumulates the characters of the line until it receives the end-of-line sequence CR-LF or just LF (block 84).

Once it has a full line, the server 10 checks the first four characters for a recognized command (block 86). If a TIME command is received (block 88), the server 10 parses a number argument following the command (block 90) and sets the new idle timeout to that value (block 92). In the preferred embodiment, the value zero indicates an infinite timeout that never expires and the default timeout is 90 seconds. Then the server 10 sends a '200' success message to the client 14 (block 94) and returns to waiting for an event (block 54).

For an MFP 16 having special requirements for the number of data packet "credits" it requires from the server 10 to enable it to send data back to the server, as known in the art, the client 14 sends a MPCT command to the server 10 with a number argument to set the minimum number of packet credits required by the MFP (block 96). If the state of the requested channel is not IDLE (block 98), the server 10 sends a '452' error message to the client 14 (block 100). Otherwise, the server 10 parses the number argument (block 102), saves it for later use when the client issues an OPEN command (block 104), and sends a '200' success message (block 106).

If an OPEN command is received for a particular channel 22 (block 108), the server 10 checks if that channel is in IDLE state (block 110). If the channel state is not IDLE, the server 10 sends a '452' error message (block 112). Otherwise, the server 10 parses the number argument following the OPEN command (block 114), sets the channel state to OPEN-WAIT (block 116), and sends an open-channel request to the MFP 16 (block 118). The MFP 16 generally operates asynchronously from the server 10 so the server does not immediately know the result of the open-channel request. A reply from the MFP 16 generally arrives shortly and is processed as a separate event as described below at Block 176 in FIG. 4D. No result message is sent to the client 14 until that time.

When a DATA command for requesting the server 10 to go into a data pass-through mode is received from the client 14 (block 120), the server checks if the channel 22 requested by the OPEN command is either in an OPEN state or an OPEN-WAIT state (block 122). If the channel state is either OPEN or OPEN-WAIT, the server 10 sets the client state to DATA (block 124), sends a '200' success message (block 126). Then the server 10 checks if the channel state is OPEN (block 127). If so, the server 10 sends any MFP data queued in the server (block 128) (see blocks 160–166 in FIG. 4A described below for responding to data received from the MFP 16 to the client 14). If not, the server 10 returns to waiting for an event (block 54). If at block 122 the channel state is neither OPEN nor OPEN-WAIT, the server 10 sends a '453' error message (block 130) and returns to waiting for an event (block 54).

Figure 4C:
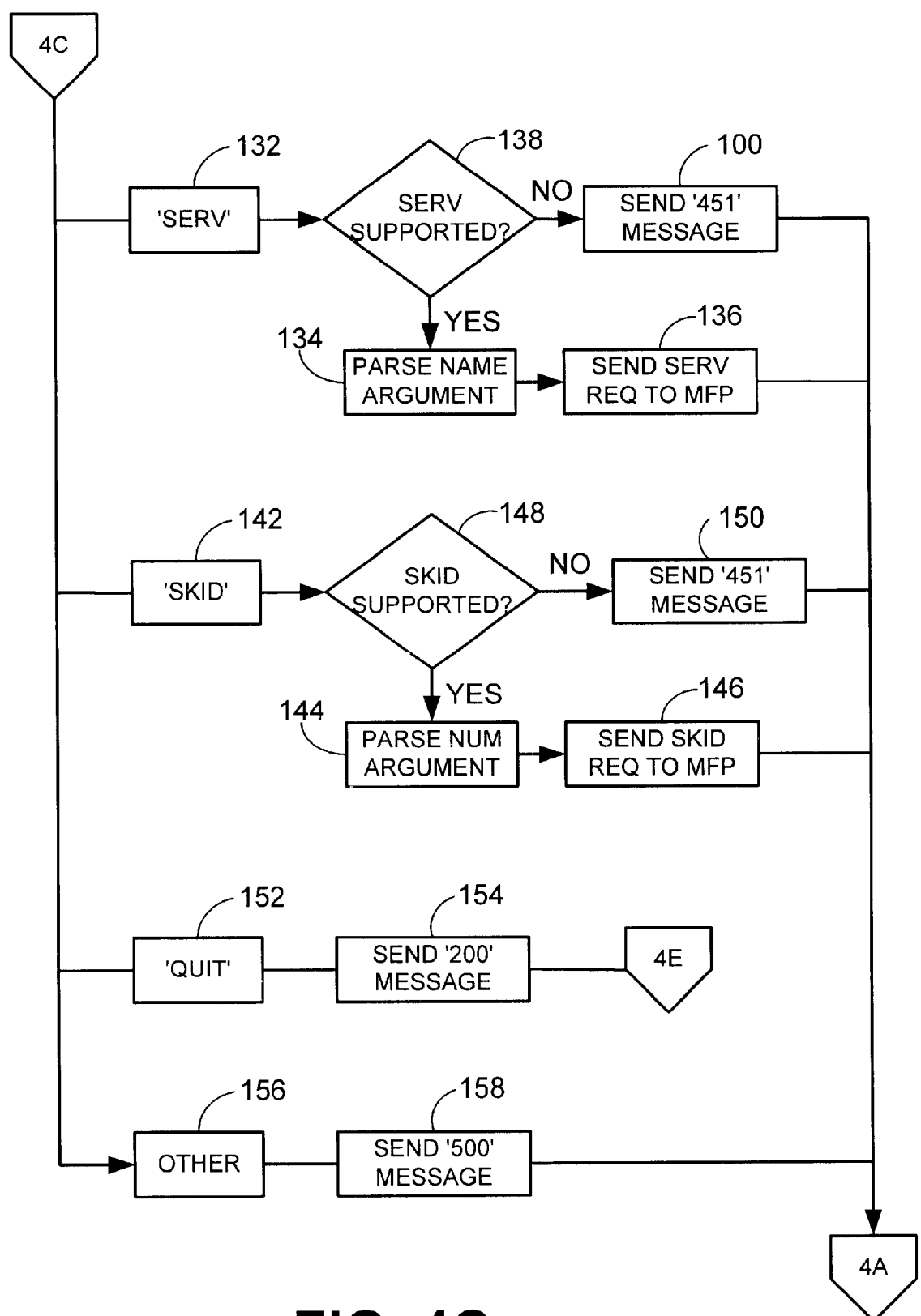

Turning now to FIG. 4C, when a SERV command is received from the client 14 (block 132), requesting a Service Name Lookup for a particular service supported by the MFP 16, the server 10 parses the word following the SERV command (block 134) and sends a Service Name Lookup request to the MFP 14 with that word as the name to be looked up (block 136). The server 10 then returns to waiting for an event (block 54), since a reply will typically and preferably arrive later as a separate event as described below and illustrated at blocks 168–174 of FIG. 4D. Those of ordinary skill in the art will recognize that a Service Name Lookup is a feature of many communication protocols used between an MFP server such as the HP JetDirect and an MFP. In the preferred embodiment, the IEEE 1284.4 protocol for parallel ports is used by the MFP 14. However, the communication link can also be a backplane such as PCI, a serial link such as USB, or many others. This command utilizes whatever Service Name Lookup protocol is supported by the communication link to the MFP 16. If the communication protocol does not support any Service Name Lookup protocol (block 138), the server 10 immediately returns a '451' error message to the client 14 and does not send any request to the MFP 14 (block 140).

Similar to the SERV command, when a SKID command is received (block 142), the server 10 parses the number following the command for specifying the "socket ID," (block 144) and sends a Socket ID Lookup request to the MFP 16 with that number as the socket to be looked up (block 146), but only if the communication protocol supports the Socket ID Lookup request (block 148). Otherwise, the server 10 immediately returns a '451' error message to the client 14 and does not send any request to the MFP 14 (block 150). The reply arrives later as a separate event as described below and illustrated at Blocks 168–174 of FIG. 4D.

When a QUIT command is received (block 152), the server sends a '200' success message to the client 14 (block 154) and then invokes the close procedure described below and illustrated in FIG. 4E. If the command received is not recognized (block 156), the server 10 sends a '500' error message to the client (block 158) and ignores the command. The server 10 then returns to waiting for an event (block 54).

Turning now back to FIG. 4A, when the server 10 receives data from the MFP 16 while waiting for an event (block 160), it simply forwards the MFP data to the client 14 (block 164), if the client is in DATA mode (block 162). If the client 14 is in COMMAND mode (block 162), the server 10 queues the data until the client issues a DATA command (block 166).

Figure 4D:
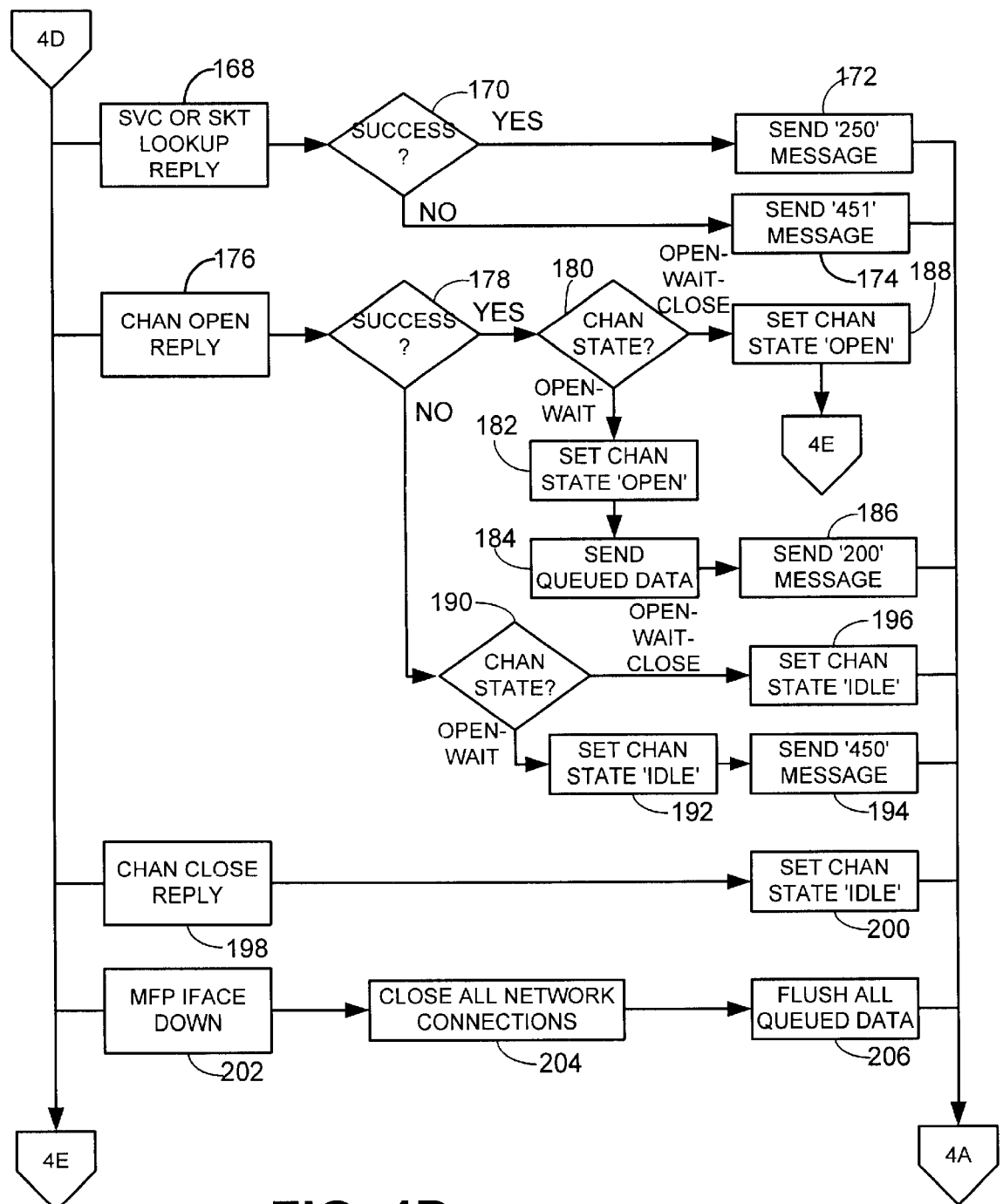

Turning now to FIG. 4D, when the server 10 receives a reply from the MFP 14 (block 168) in response to either the Service Name Lookup or the Socket ID Lookup commands described above at blocks 138–150 of FIG. 4C, the server 10 extracts the returned socket ID or the service name, respectively, and sends it to the client 14 in a '250' message (block 172), if the MFP returns a successful lookup (block 170). It should be noted that the '250' message is followed by a mandatory text indicating the socket ID or the service name, depending on the command issued by the client 14. The text is in a form of a string of numbers which the client 14 parses. If an unsuccessful reply is received, the server 10 sends a '451' error message to the client 14 (block 174). In this manner, the socket ID of the desired service is obtained by the client 14, which can then open a communication channel to that socket ID for using the desired service. Reversely, the client 14 obtains the name of the service associated with a particular socket ID from the service name returned by the MFP 14.

When the server 10 receives a reply from the MFP 16 in response to an OPEN command from the client 14 as described above at blocks 108–118 in FIG. 4B (block 176), the server 10 checks the outcome of the request (block 178). If it was successful, the server 10 then checks the channel state (block 180). If the state is OPEN-WAIT, the server 10 sets the state to OPEN (block 182), sends to the MFP 16 any data that was queued in the server waiting for the OPEN state (block 184) (described above in blocks 72–76 and 80 in FIG. 4A), and sends a '200' success message to the client 14 to respond to the OPEN command. If the channel state is OPEN-WAIT-CLOSE, as described below at block 218 of FIG. 4E (block 180), the server 10 sets the state to OPEN and then immediately invokes the close connection procedure described below and shown in FIG. 4E (block 188). If the open-channel request was unsuccessful (block 178), the server 10 checks the channel state (block 190). If the state is OPEN-WAIT, the server 10 sets the state to IDLE (block 192) and sends a '450' error message to the client 14 (block 194). If the state is OPEN-WAIT-CLOSE, the server 10 simply sets the state to IDLE (block 196).

When the server 10 receives a channel close reply from the MFP 16 (block 198), the server immediately sets the channel state to IDLE (block 200). In the event the communication link to the MFP 16 fails for any reason (block 202), for example, the communication cable being disconnected or the MFP being shut down, the server 10 immediately closes all network connections (block 204) and flushes any queued data (block 206).

Figure 4E:
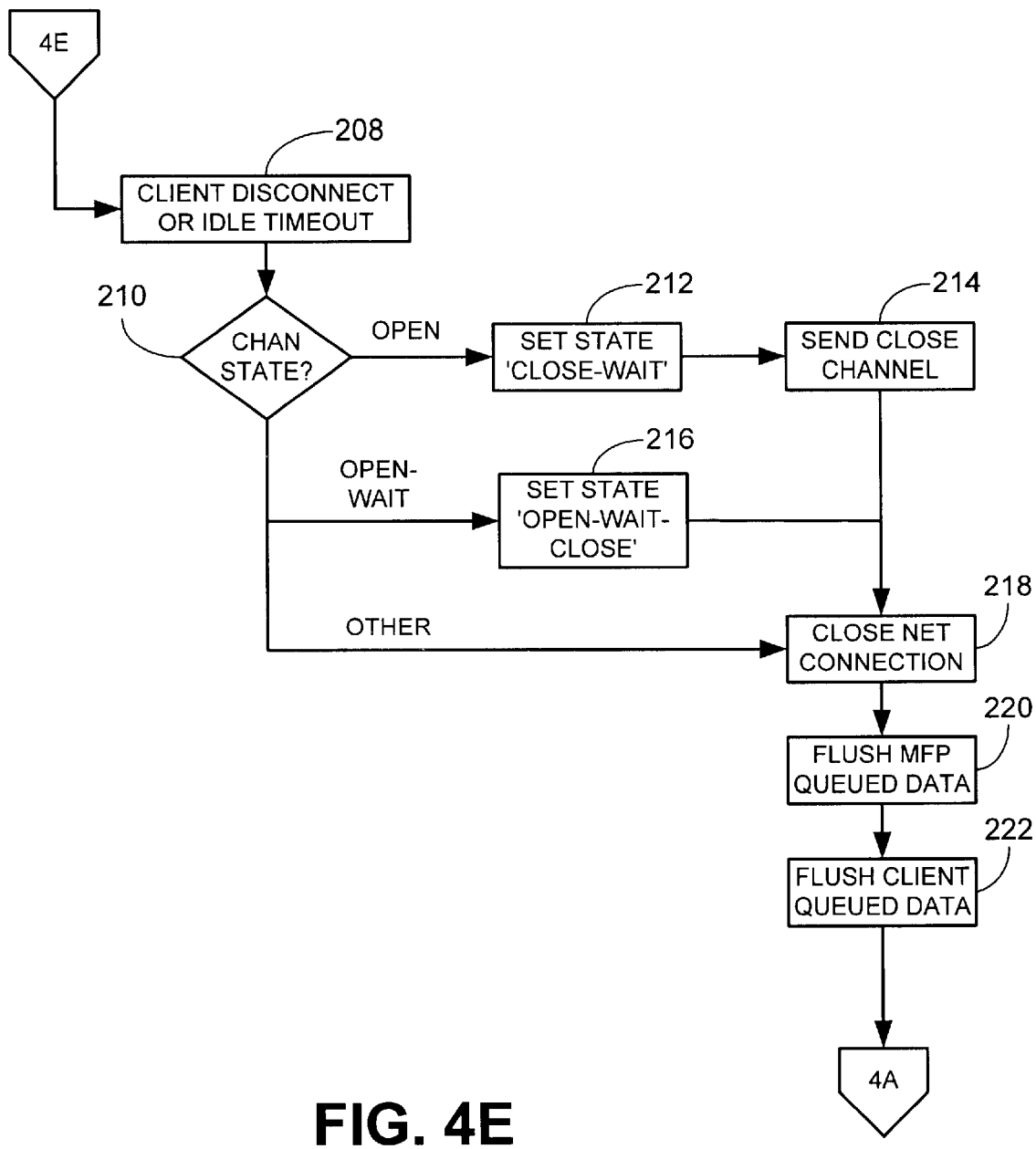

Turning now to FIG. 4E, the server 10 initiates a procedure for closing the connection to the MFP 16 whenever a QUIT command is issued by the client as at Block 152 above in FIG. 4C, any time the server wishes to initiate a close due to an error or some other unrecoverable condition or when the idle timeout expires (block 208). To close a connection, the server 10 first checks the state of the communication channel 22 to the MFP 16 (block 210). If it is OPEN, the server 10 sets it to CLOSE-WAIT (block 212) and sends a close-channel request to the MFP 16 (block 214). If the state is OPEN-WAIT, the server 10 sets it to OPEN-WAIT-CLOSE state (block 216), which results in a close-request being sent as soon as an open reply is received (see the description above of blocks 176–180 and 188 of FIG. 4D). No channel actions are needed in any other state. After dealing with the channel state, the server 10 closes, or finishes closing the network connection (block 218). Finally, the server 10 deletes any data queued for either the MFP 16 and/or the network client 14 (blocks 220, 222), and returns to waiting for an event (block 54).

From the foregoing description, it should be understood that an improved peripheral server has been shown and described which has many desirable attributes and advantages. It is adapted to enable a plurality of clients in a network to access a plurality of functions supported by a multifunction peripheral connected to the network. The server allows the client to select at least one function, which is then made to be accessible to the client by a peripheral communication channel that corresponds to the address of the selected function. A single gateway is used to connect the client to any of the communication channels selected.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A network peripheral server adapted to enable a plurality of clients in a network to access a plurality of functions supported by at least one multifunction peripheral connected to the network, said server comprising:

a network interface for communicating with the clients on the network according to a predetermined network protocol;

a peripheral interface for communicating with the multi function peripheral via a plurality of peripheral channels corresponding to the plurality of the functions supported by the multifunction peripheral;

a gateway communicatively connected between said network interface and said peripheral interface for transferring data between said network interface and said peripheral interface; and, control means, responsive to instructions from at least one of the plurality of clients for a select peripheral function, for determining whether said select peripheral function is included in the plurality of functions supported by the multifunction peripheral and operatively connecting said at least one client with said select peripheral function of the multifunction peripheral via one of said plurality of peripheral channels which corresponds to said select peripheral function, if said select peripheral function is supported by said multifunction peripheral.

2. The server according to claim 1, wherein said instructions include an instruction for requesting an address of said at least one selected function, and said control means responsive to said instruction obtains said address from the multifunction peripheral and provides said address to a client which requested said address.

3. The server according to claim 2, wherein said instructions include an instruction for opening a peripheral channel corresponding to said address, and control means responsive to said instruction for opening opens said peripheral channel to communicatively connect said client to said peripheral channel.

4. The server according to claim 3, wherein said control means sends data received from said client to the multifunction peripheral through said peripheral channel when said peripheral channel is open, and queues said data in the server when said peripheral channel is not open.

5. The server according to claim 4, wherein said data is passed through said gateway for each of said at least one selected function.

6. The server according to claim 3, wherein said control means sends data received from the multifunction peripheral through said peripheral channel to said client when said client is in a data receiving mode and queues said data in the server when said client is in a command mode.

7. The server according to claim 6, wherein said data is passed through said gateway for each of said at least one selected function.

8. The server according to claim 2, wherein said server provides said address to said client in a number string format which is parsed by said client.

9. The server according to claim 1, wherein said instructions include an instruction for opening a peripheral channel corresponding to an address of said selected function, and control means responsive to said instruction for opening opens said peripheral channel to communicatively connect a client which issued said instruction to said peripheral channel via said gateway.

10. The server according to claim 1, wherein said instructions include an instruction for requesting a type of a function corresponding to a selected one of said plurality of peripheral channels, and said control means responsive to said instruction obtains said type of said function from the multifunction peripheral and provides said type of said function to a client which requested said type of said function.

11. The server according to claim 1, wherein said control means is adapted to simultaneously connect at least two functions of the multifunction peripheral with said at least one client.

12. The server according to claim 1 wherein said network interface include at least one TCP port and at least one SPX socket.

13. The server according to claim 1, wherein said peripheral interface is one of IEEE 1284.4, HP-EIO, HP-MIO, PCI, USB and IEEE 1394 interfaces.

14. The server according to claim 1, wherein said peripheral channels are IEEE 1284.4 channels.

15. The server according to claim 1, wherein said gateway is communicatively established between said network and said peripheral interface for each multifunction peripheral when a plurality of the multifunction peripheral are connected to the network.

16. The server according to claim 15, wherein said gateway for said each multifunction peripheral is operated independently with respect to each other.

17. A method for enabling a plurality of clients connected to a network via a peripheral server to access a plurality functions supported by a multifunction peripheral connected to the network, said method comprising the steps of:

sending an instruction from at least one of the plurality of clients for requesting a peripheral channel of the server corresponding to at least one selected function of the multifunction peripheral;

determining whether said selected function is included in the plurality of function supported by the multifunction peripheral;

opening said corresponding peripheral channel to communicatively connect said at least one client to said at least one selected function if said selected function is supported by the multifunction peripheral; and, transferring data between said at least one client and said multifunction peripheral through the peripheral server.

18. The method according to claim 17 wherein, said data is transmitted through a single gateway in the peripheral server.

* * * * *